(12) United States Patent
Nishimura et al.

(10) Patent No.: US 8,704,497 B2
(45) Date of Patent: Apr. 22, 2014

(54) CONTROL DEVICE FOR VEHICLE AC GENERATOR

(75) Inventors: Shinji Nishimura, Chiyoda-ku (JP); Noriyuki Wada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 513 days.

(21) Appl. No.: 12/904,784

(22) Filed: Oct. 14, 2010

(65) Prior Publication Data

US 2011/0260697 A1 Oct. 27, 2011

(30) Foreign Application Priority Data

Apr. 23, 2010 (JP) ................................. 2010-099722

(51) Int. Cl.
*H02P 9/00* (2006.01)

(52) U.S. Cl.
USPC ........................................................ 322/28

(58) Field of Classification Search
USPC ........................................................ 322/28
See application file for complete search history.

(56) References Cited

U.S. PATENT DOCUMENTS

| | | | | |
|---|---|---|---|---|
| 4,788,452 A * | 11/1988 | Stanley | ............................ | 307/71 |
| 6,175,217 B1 * | 1/2001 | Da Ponte et al. | ................ | 322/19 |
| 7,235,952 B2 * | 6/2007 | Maehara | .......................... | 322/24 |
| 7,602,152 B2 * | 10/2009 | Oshima et al. | ................... | 322/33 |
| 2003/0042876 A1 * | 3/2003 | Ikeda | ............................... | 322/37 |
| 2005/0057226 A1 * | 3/2005 | Kawakami et al. | ............. | 322/24 |
| 2005/0093520 A1 * | 5/2005 | Muramatsu et al. | ............ | 322/29 |
| 2006/0108987 A1 * | 5/2006 | Aoyama | .......................... | 322/28 |
| 2006/0238172 A1 * | 10/2006 | Maehara et al. | ................. | 322/33 |
| 2007/0085512 A1 * | 4/2007 | Maehara | .......................... | 322/28 |
| 2007/0114976 A1 * | 5/2007 | Inokuchi et al. | ................ | 322/28 |
| 2007/0247119 A1 * | 10/2007 | Maehara | .......................... | 322/28 |
| 2008/0088282 A1 * | 4/2008 | Inokuchi et al. | ................ | 322/28 |
| 2008/0094039 A1 * | 4/2008 | Oshima | ............................ | 322/28 |
| 2008/0157725 A1 * | 7/2008 | Yoshida | ........................... | 322/24 |
| 2008/0186000 A1 * | 8/2008 | Kimura et al. | ................... | 322/23 |
| 2008/0224671 A1 * | 9/2008 | Kimura et al. | ................... | 322/19 |
| 2009/0039838 A1 * | 2/2009 | Maehara | .......................... | 322/19 |
| 2009/0058373 A1 * | 3/2009 | Graovac et al. | ................. | 322/25 |
| 2009/0224600 A1 * | 9/2009 | Kizawa et al. | ................... | 307/9.1 |
| 2011/0260696 A1 * | 10/2011 | Nishimura et al. | ............. | 322/28 |

FOREIGN PATENT DOCUMENTS

| | | |
|---|---|---|
| JP | 03-045200 A | 2/1991 |
| JP | 06-225476 A | 8/1994 |
| JP | 08-238000 A | 9/1996 |

* cited by examiner

*Primary Examiner* — Tulsidas C Patel
*Assistant Examiner* — Viet Nguyen
(74) *Attorney, Agent, or Firm* — Sughrue Mion, PLLC (57) ABSTRACT

In order to receive a power generation command from the outside of a body, to transmit power generation control condition with respect to the power generation command to the outside, and to enable a vehicle to drive properly depending on the condition; a minimum value selector by which on-duty of a switching element by the power generation command inputted from the outside of the body of a control device is compared to on-duty of the switching element calculated inside the body of the control device and smaller on-duty of both on-duties is selected to perform ON/OFF control of the switching element is included, and the selected on-duty is transmitted to the outside.

8 Claims, 8 Drawing Sheets

CONTROL DEVICE FOR VEHICLE AC GENERATOR

BACKGROUND OF THE INVENTION

1. Field of the Invention

The present invention relates to a control device for a vehicle AC (alternating current) generator and, more particularly, relates to one to which a power generation command is inputted from the outside of a body, and which transmits power generation control condition to the outside of the body.

2. Description of the Related Art

In a known device (Japanese Unexamined Patent Publication No. H8-238000), there is disclosed a vehicle charging device which outputs power generation control condition of a generator to the outside and forcibly controls a power generation state from the outside. When power generation operation is performed by a power generation command from the outside, operation is performed as specified by the command; and when the power generation command from the outside is not present, voltage control is performed.

In Japanese Unexamined Patent Publication No. H8-238000, power generation control is performed by the power generation command from an outside controller (ECU). When the power generation command is received from the outside controller, power generation can be controlled only as specified by the power generation command. That is, even when a power generation command that is harsh for the generator is received, the generator generates power as specified by the power generation command; as a result, the generator is burned out. In the case where the generator is designed so as not to be burned out even when the power generation command that is harsh is received, only considerably low production of electricity can be obtained or the generator becomes much larger.

For example, a generator, which supplies a field current from a DC output voltage by a system in which the DC output voltage is variable, can be operated at the maximum field current at low voltage output. However, when the maximum field current flows at high voltage output, an excessive field current flows due to high voltage and thus the generator is burned out. For this reason, a method in which the field current is detected and the maximum field current is restricted is known (Japanese Unexamined Patent Publication No. H3-45200). However, it is not known whether or not an outside controller is restricted only by being restricted; and therefore, for example, it becomes difficult to stabilize engine rotational speed.

SUMMARY OF THE INVENTION

The present invention has been made to solve the foregoing problem, and an object of the present invention is to receive a power generation command from the outside of a body, to transmit power generation control condition with respect to the power generation command to the outside, and to enable a vehicle to drive properly depending on the condition.

According to the present invention, there is provided a control device for a vehicle AC generator, in which a DC (direct current) voltage obtained by rectifying an AC output voltage of an armature coil in the AC generator that has the armature coil and a field coil with a rectifier is applied to the field coil to obtain a field current, and the field current is controlled by ON/OFF of a switching element connected in series to the field coil. The control device for the vehicle AC generator includes a minimum value selector by which on-duty of the switching element by a power generation command inputted from the outside of a body of the control device is compared to on-duty of the switching element calculated inside the body of the control device, and smaller on-duty of both on-duties is selected to perform ON/OFF control of the switching element; and transmits the selected on-duty to the outside.

According to the control device for the vehicle AC generator of the present invention, the on-duty of the switching element by the power generation command inputted from the outside of the body of the control device is compared to the on-duty of the switching element calculated inside the body of the control device, smaller on-duty of both on-duties is selected to perform ON/OFF control of the switching element, and the selected on-duty is transmitted to the outside, whereby power generation control condition with respect to the power generation command is known and it enables a vehicle apparatus to drive properly depending on the condition.

Furthermore, according to the present invention, there is provided a control device for a vehicle AC generator, in which a DC voltage obtained by rectifying an AC output voltage of an armature coil in the AC generator that has the armature coil and a field coil with a rectifier is applied to the field coil to obtain a field current, and the field current is controlled by ON/OFF of a switching element connected in series to the field coil. The control device for the vehicle AC generator includes a minimum value selector by which on-duty of the switching element by a power generation command inputted from the outside of a body of the control device is compared to on-duty of the switching element calculated inside the body of the control device, and smaller on-duty of both on-duties is selected to perform ON/OFF control of the switching element; and transmits to the outside as to whether or not the selected on-duty coincides with the power generation command from the outside.

According to the control device for the vehicle AC generator of the present invention, the minimum value selector by which the on-duty of the switching element by the power generation command inputted from the outside of the body of the control device is compared to the on-duty of the switching element calculated inside the body of the control device, and smaller on-duty of both on-duties is selected to perform ON/OFF control of the switching element, is included; and transmission is performed to the outside as to whether or not the selected on-duty coincides with the power generation command from the outside, whereby power generation control condition with respect to the power generation command is known and it enables a vehicle apparatus to drive properly depending on the condition.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1.

Figure 1:
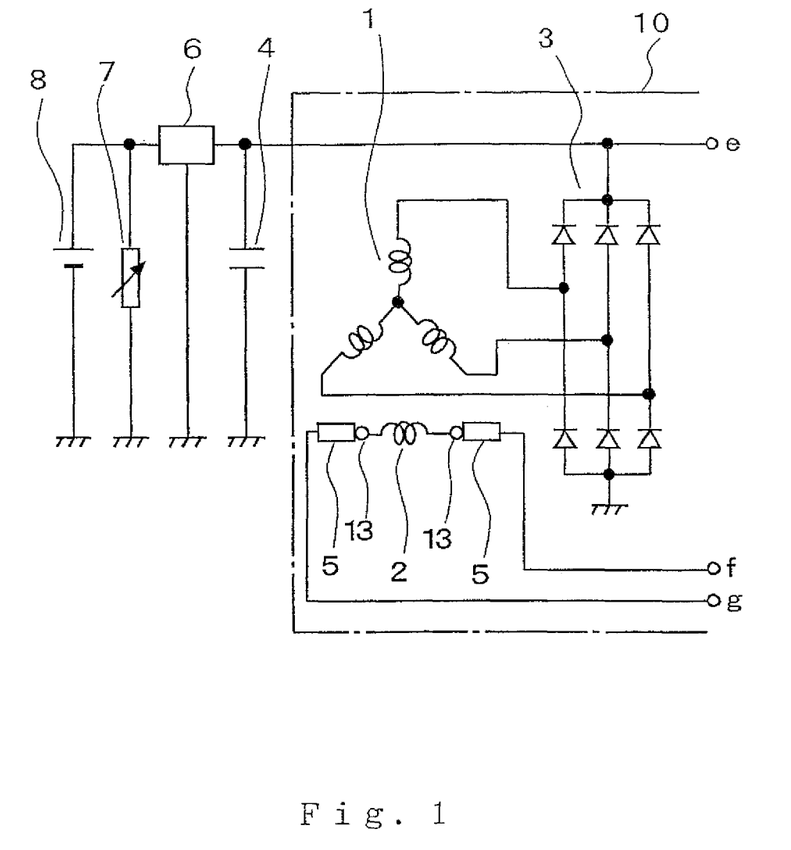
FIG. 1 is a configuration diagram showing a vehicle AC generator to which Embodiment 1 of the present invention is applied.
Figure 2:
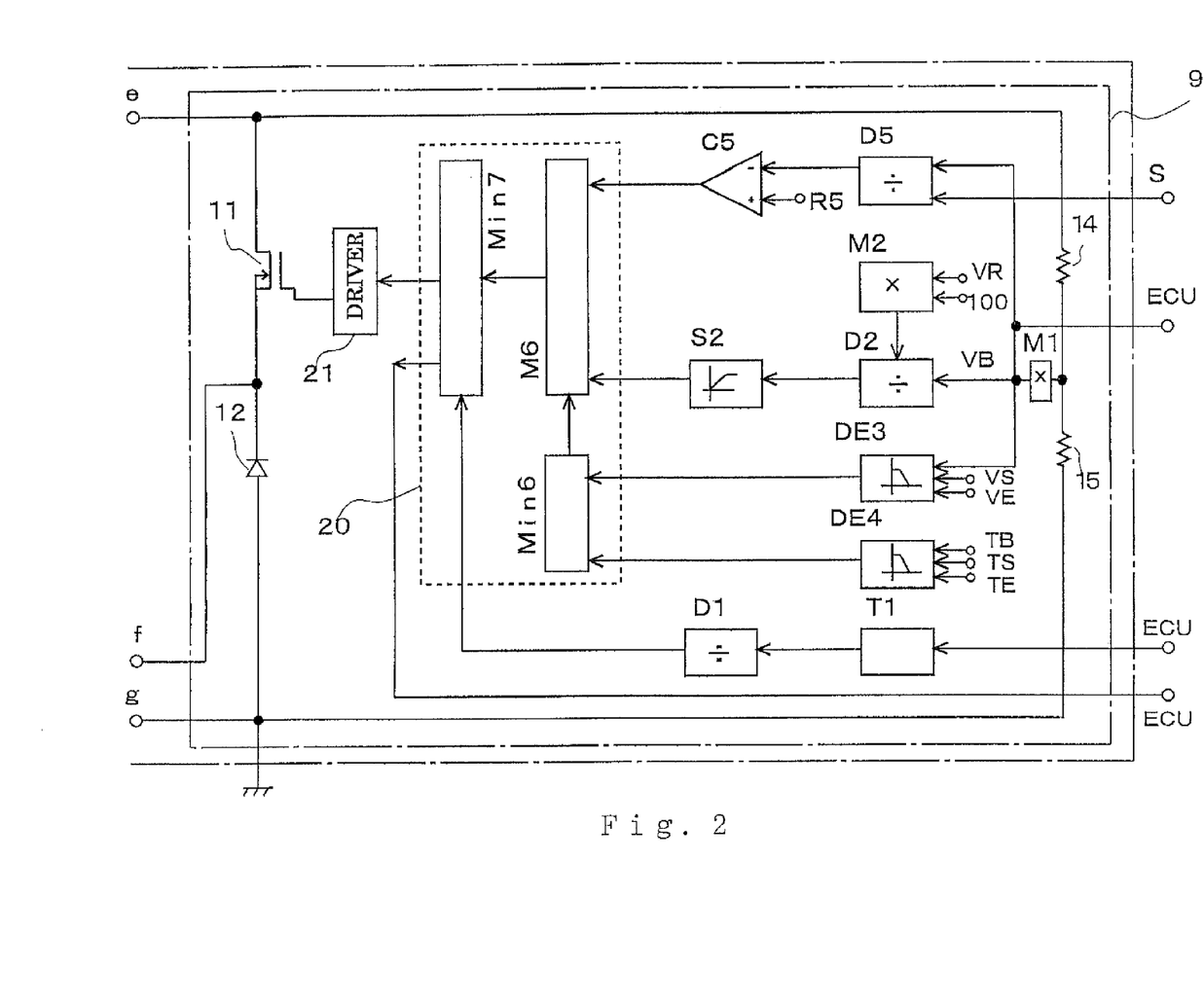
FIG. 2 is a block diagram showing the control device for the vehicle AC generator of Embodiment 1.

FIG. 1 is a configuration diagram showing a vehicle AC generator to which Embodiment 1 of the present invention is applied. FIG. 2 is a block diagram showing a control device 9 for the vehicle AC generator of Embodiment 1 and terminals e, f, and g shown in FIG. 1 are connected to terminals e, f, and g shown in FIG. 2; accordingly, the whole of a vehicle AC generator system 10 is shown. In FIG. 1, when an internal combustion engine (not shown in the drawing) is started up, a rotor (having a field coil 2) of the AC generator (hereinafter, referred to as "generator") is driven via a belt (not shown in the drawing). The field coil 2 is connected to the terminals f and g via slip rings 13 and brushes 5. With the driving of the rotor, an AC output voltage generated by a three phase armature coil 1 (on the stator side) is rectified by a three phase full wave rectifier 3. The generator is composed of the armature coil 1, the field coil 2, and the rectifier 3.

A DC voltage (DC output voltage) rectified by the rectifier 3 is charged to an electric double layer capacitor 4 connected to the rectifier 3. A terminal voltage of the electric double layer capacitor 4 rises by being charged. The electric double layer capacitor 4 is connected to a voltage converter (DC/DC converter) 6 by which voltage of the electric double layer capacitor 4 is converted to 14V to charge a battery 8, and a power of 14V is supplied to an electric load 7 of other vehicle.

In FIG. 2, reference numeral 11 denotes a switching element, such as a power semiconductor switching element configured by a MOSFET (metal-oxide semiconductor field-effect transistor). The switching element 11 is connected in series to the field coil 2. A DC voltage or the DC voltage of the electric double layer capacitor 4 is applied to a series body of the switching element 11 and the field coil 2, and a field current of the field coil 2 is controlled by performing ON/OFF control of the switching element 11. Reference numeral 12 denotes a reflux diode; and when the switching element 11 is turned off, the field current by residual energy in the field coil 2 is refluxed through the reflux diode 12. The DC voltage of the rectifier 3 of the generator or the DC voltage of the electric double layer capacitor 4 is applied to a resistor 14 and a resistor 15, and a divided voltage thereof VB/α is led out from a node of the resistor 14 and the resistor 15. In this regard, however, VB is the DC voltage of the rectifier 3 or the DC voltage of the electric double layer capacitor 4, and α is a voltage division ratio. The divided voltage VB/α is multiplied by α with a multiplier M1 and the DC voltage VB is outputted. The DC voltage VB is also outputted to the outside (ECU).

Figure 3:
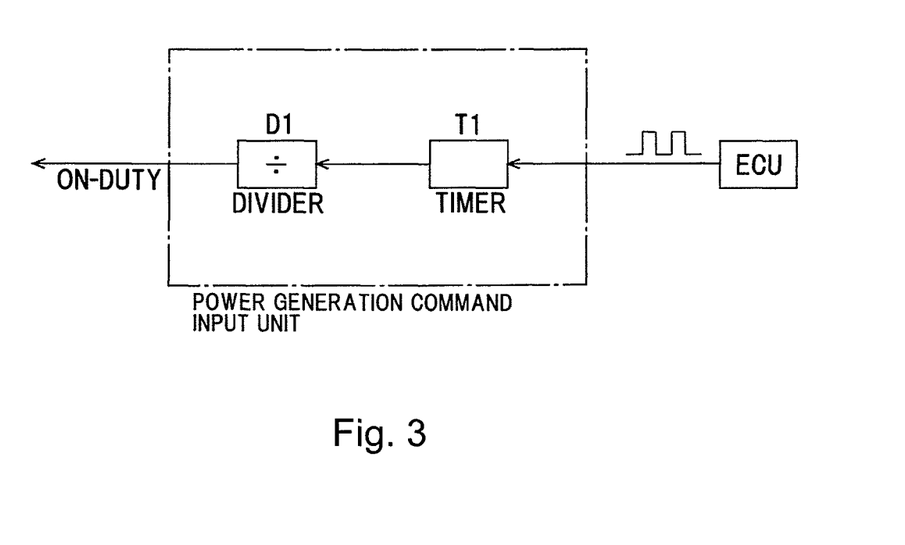
FIG. 3 is a diagram for explaining a block configuration of a power generation command input unit in Embodiment 1.

Hereinafter, block configurations and operation of the ON/OFF control of the switching element 11 in FIG. 2 will be described. A power generation command from the outside, that is, an ECU (engine control unit) is inputted as one that specifies on-duty of the switching element 11 (duty factor at which the switching element 11 is turned on). FIG. 3 is a diagram for explaining a block configuration of a power generation command input unit in Embodiment 1. A pulse train serving as the power generation command is inputted from the ECU to a Timer T1. An ON time and a cycle of the inputted pulse train (PWM signal) are found by the Timer T1, this output is inputted to a divider D1, and the on-duty of the switching element 11 based on the power generation command is outputted. Incidentally, as the power generation command from the ECU, those which directly output the on-duty of the switching element 11, such as a PWM signal, an analog signal, or a digital signal may be permissible. Then, the on-duty of the switching element 11 from the divider D1 or the ECU is inputted to a minimum value selector Min7 of an integrated selector 20. In addition, operation of the integrated selector 20 will be described later.

When the on-duty of the switching element 11 based on the power generation command is selected as the output of the minimum value selector Min7, the on-duty is outputted from a drive circuit (driver) 21 and ON/OFF control (PWM control) of the switching element 11 is performed by the on-duty. Then, a field current is supplied from the electric double layer capacitor 4, the generator starts power generation, and a DC voltage rectified by the rectifier 3 is charged to the electric double layer capacitor 4. When the electric double layer capacitor 4 is charged, voltage rises; and therefore, when the on-duty is a constant value, an average voltage to be applied to the field coil 2 rises and the field current increases. When the voltage rises, the power generation command from the ECU reduces the on-duty of the switching element 11 so as to restrict the DC voltage.

Figure 4:
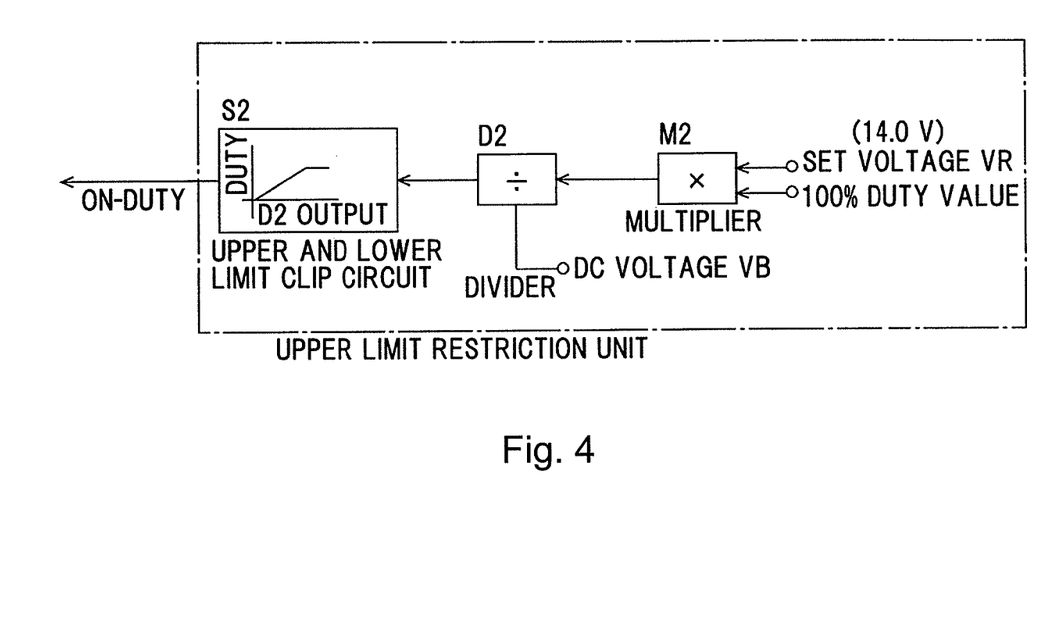
FIG. 4 is a diagram for explaining a block configuration of an upper limit restriction unit which restricts an upper limit of a field current in Embodiment 1.

Next, FIG. 4 is a diagram for explaining a block configuration of an upper limit restriction unit which restricts an upper limit of the field current to the maximum field current at a set voltage in Embodiment 1. A charging voltage of the battery 8, for example, 14.0V is inputted to a multiplier M2 as a predetermined set voltage VR. The set voltage VR is a voltage value capable of continuing energization even if the field current to the field coil 2 is on-duty 100%. A 100% duty value is further inputted to the multiplier M2 and 100 VR % is outputted from the multiplier M2. The 100 VR % is inputted to a divider D2; and as a further other input, the DC voltage VB of the rectifier 3 (or, DC voltage of the electric double layer capacitor 4) is inputted. 100 VR %/VB, that is, the set voltage/the DC voltage is found by the divider D2 and is outputted. The output value is converted by an upper and lower limit clip circuit S2, and the on-duty of the switching element 11 is outputted as on-duty capable of continuing energization. The on-duty output is restricted to not higher than 100%.

An upper limit on-duty of the switching element 11 by the upper limit restriction unit is based on the set voltage/the DC voltage; and therefore, even if the DC voltage of the rectifier 3 becomes large, the upper limit of the field current can be restricted to the maximum field current at the set voltage. In the integrated selector 20, the upper limit on-duty of the switching element 11 found (by the upper limit restriction unit) based on the set voltage/the DC voltage and the on-duty of the switching element 11 by the power generation command are inputted to the minimum value selector Min7 and are compared, smaller on-duty thereof is outputted as actual on-duty, and ON/OFF control of the switching element 11 is performed via the drive circuit 21. In this way, for example, if the DC voltage is 28 V, the maximum on-duty becomes 0.5 (i.e., 14 V/28 V=0.5), and the average voltage to be applied to the field coil is restricted to an output voltage of 14 V (i.e., 28 V×0.5=14 V). Consequently, even when excessive on-duty is inputted by the power generation command, safe control can be achieved by a comparison with an internal command and only the average voltage of 14 V is applied to the field coil; and therefore, burnout of the field coil and burnout of the generator due to excessive power generation can be prevented. Furthermore, a current sensor is not used and thus it becomes possible to achieve inexpensively; and time parameter that is on-duty is controlled and therefore good accuracy is achieved.

Figure 5:
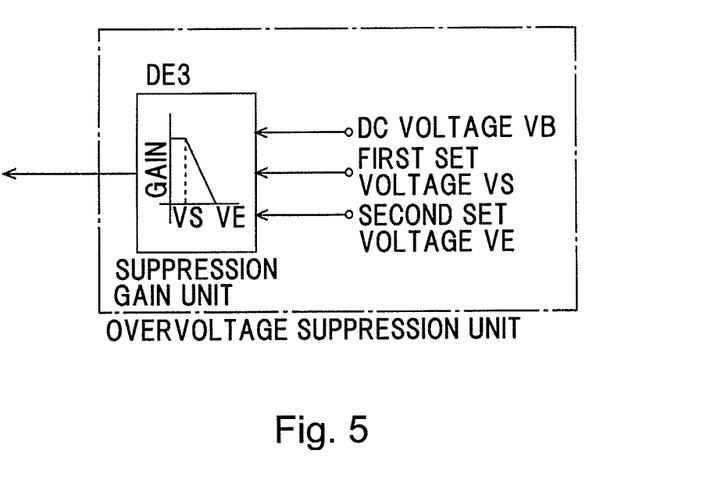
FIG. 5 is a diagram for explaining a block configuration of an overvoltage suppression unit which suppresses an over output voltage in Embodiment 1.

FIG. 5 is a diagram for explaining a block configuration of an overvoltage suppression unit which suppresses an over output voltage in Embodiment 1. The DC voltage VB is inputted to a suppression gain unit DE3; and as further other inputs, a first set voltage VS (overvoltage suppression start voltage, for example, 27.5 V) and a second set voltage VE (overvoltage suppression end voltage, for example, 28.5 V) are inputted. When the DC voltage VB starts to exceed the first set voltage VS, gain is suppressed; with a further rise of the DC voltage VB, the gain is further suppressed; and when the DC voltage VB reaches the second set voltage VE, the gain becomes zero. Then, the output of the suppression gain unit DE3, the output being 1, is continuously decreased from 1 (or gradually decreased) when the DC voltage VB starts to exceed the first set voltage VS; and the output of the suppression gain unit DE3 becomes zero when the DC voltage VB reaches the second set voltage VE. The upper limit on-duty that is the output of the upper limit restriction unit is multiplied by the output of the suppression gain unit DE3 with the multiplier M6 of the integrated selector 20; and accordingly, the on-duty can be reduced when the DC voltage VB is from the first set voltage VS to the second set voltage VE.

That is, when the electric load 7 is small, even in the case of restricted (the set voltage/the DC voltage) upper limit on-duty as described above, the electric double layer capacitor 4 is further charged and a power generation voltage rises. Ordinarily, the voltage of the electric double layer capacitor 4 is detected by an outside controller (ECU) which outputs the power generation command and the power generation command is controlled so that the power generation voltage does not exceed an allowable voltage (second set voltage VE) of the electric double layer capacitor 4. However, when the power generation command is further received even beyond the allowable voltage of the electric double layer capacitor 4 due to any defect, the suppression gain unit DE3 controls the on-duty to zero; and therefore, there are effects in that the field current is cut off, the generator does not generate power, the voltage rise of the electric double layer capacitor 4 is suppressed, and the electric double layer capacitor 4 is protected.

Figure 6:
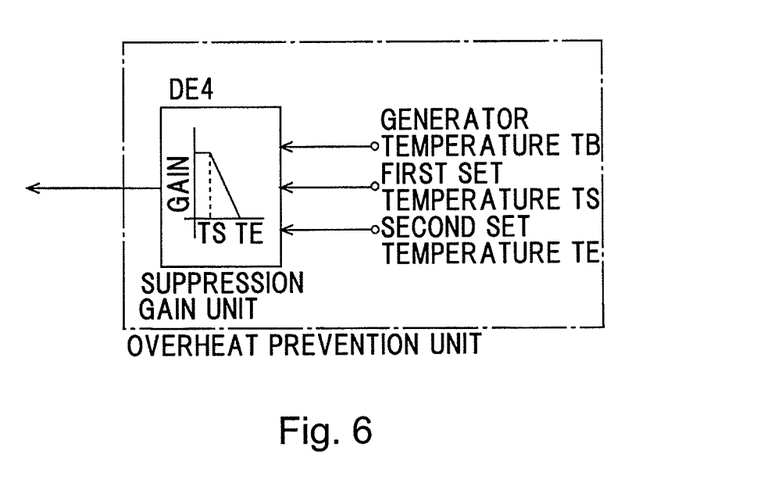
FIG. 6 is a diagram for explaining a block configuration of an overheat prevention unit which prevents overheat in Embodiment 1.

FIG. 6 is a diagram for explaining a block configuration of an overheat prevention unit which prevents overheat in Embodiment 1. A generator temperature TB of a temperature sensor (not shown in the drawing) of the generator is inputted to a suppression gain unit DE4. A first set temperature TS (temperature that starts the suppression of the output against overheat) and a second set temperature TE (temperature that makes the output zero against overheat limitation) are inputted to the suppression gain unit DE4 as further other inputs. When the generator temperature TB starts to exceed the first set temperature TS, gain is suppressed; with a further rise of the generator temperature TB, the gain is further suppressed; and when the generator temperature TB reaches the second set temperature TE, the gain becomes zero.

Then, the output of the suppression gain unit DE4, the output being 1, is continuously decreased from 1 (or gradually decreased) when the generator temperature TB starts to exceed the first set temperature TS; and the output of the suppression gain unit DE4 becomes zero when the generator temperature TB reaches the second set temperature TE. The upper limit on-duty that is the output of the upper limit restriction unit is multiplied by the output of the suppression gain unit DE4 with the multiplier M6 of the integrated selector 20; and accordingly, the on-duty can be reduced when the generator temperature TB is from the first set temperature TS to the second set temperature TE. The on-duty becomes zero when the generator temperature TB exceeds the second set temperature TE; and therefore, overheat of the generator can be prevented.

Figure 7:
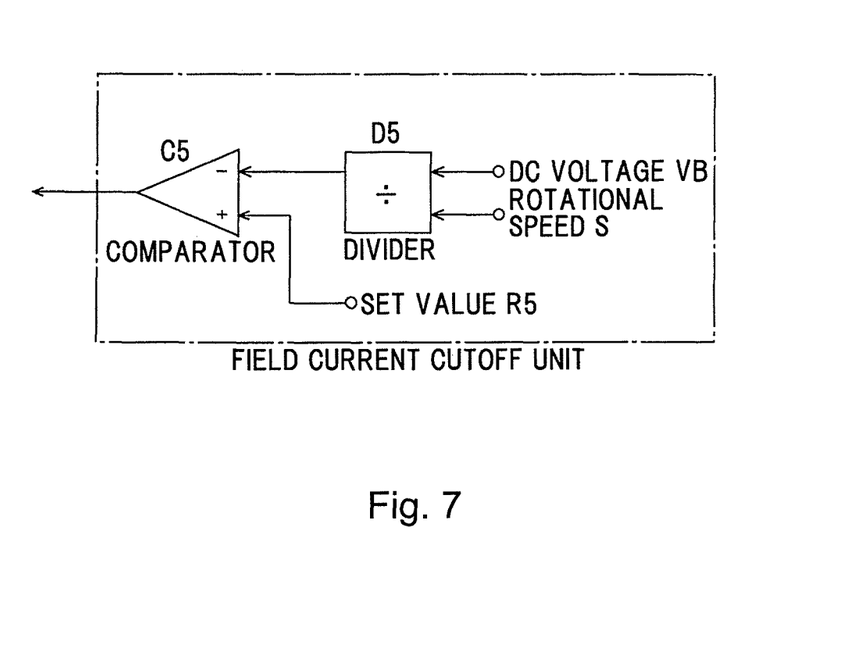
FIG. 7 is a diagram for explaining a block configuration of a field current cutoff unit which cuts off an unnecessary field current in Embodiment 1.

FIG. 7 is a diagram for explaining a block configuration of a field current cutoff unit which cuts off an unnecessary field current in Embodiment 1. The DC voltage VB of the rectifier 3 or the DC voltage VB of the electric double layer capacitor 4 is inputted to a divider D5. Rotational speed S of a rotational speed detector (not shown in the drawing) of the generator is further inputted to the divider D5. The DC voltage VB/the rotational speed S is found by the divider D5 and is inputted to an inversion input terminal of a comparator C5. A set value R5 is inputted to a reference input terminal of the comparator C5. When the DC voltage VB/the rotational speed S is not lower than the set value R5, the output of the comparator C5 becomes zero. The upper limit on-duty that is the output of the upper limit restriction unit is multiplied by the output of the comparator C5 with the multiplier M6 of the integrated selector 20; accordingly, the on-duty can become zero when the DC voltage VB/the rotational speed S is not lower than the set value R5; and therefore, the field current can be cut off.

In the generator, when the field current flows at the maximum level, voltage at which power can be generated is determined by rotational speed; and therefore, when the rotational speed is low, power cannot be generated even when the field current flows at the maximum level. Consequently, since the field current is used in vain even when the field current flows at the rotational speed at which power generation cannot be performed, the field current is cut off at that time; accordingly, loss can be reduced. More particularly, in the AC generator system in which the DC voltage is variable, power generation start rotational speed changes depending on the DC voltage of the electric double layer capacitor 4; and therefore, if parameter that is the DC voltage/the rotational speed is adopted, judgment can be made whether or not power generation can be performed by only comparing with the set value and thus the AC generator system can be simplified. In this case, the rotational speed detector of the generator may use one which can detect power generation frequency of the generator due to residual magnetic flux, or may use other unit which can estimate the rotational speed of the generator, such as engine rotational speed.

Figure 8:
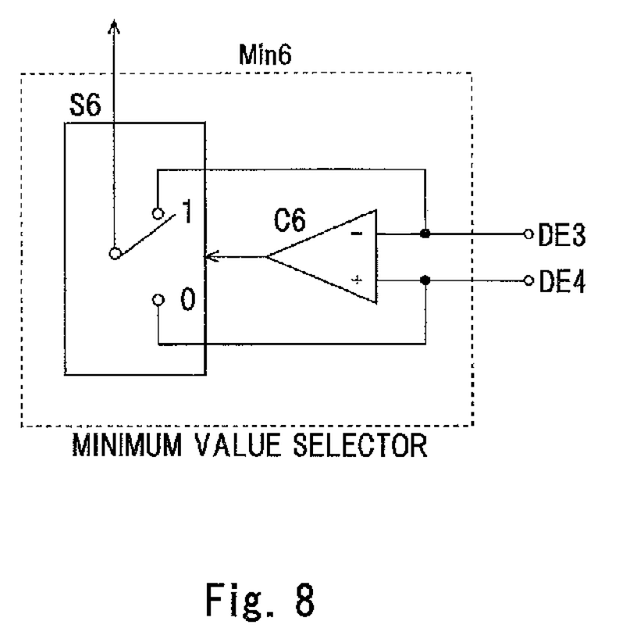
FIG. 8 is a diagram for explaining a block configuration of a minimum value selector in Embodiment 1.

Next, the operation of the integrated selector 20 shown in FIG. 2 will be described. The outputs of the overvoltage suppression unit (suppression gain unit DE3) and the overheat prevention unit (suppression gain unit DE4) are inputted to a minimum value selector Min6; smaller output of the outputs is selected; and this output is inputted to the multiplier M6. FIG. 8 is a diagram for explaining a block configuration of the minimum value selector in Embodiment 1. The output DE4 of the overheat prevention unit is inputted to a reference input terminal of a comparator C6; the output DE3 of the overvoltage suppression unit is inputted to an inversion input terminal of the comparator C6; and both inputs are compared by the comparator C6. When DE3 is smaller than DE4, "1" is outputted from the comparator C6; DE3 is selected by the selector S6; and DE3 is outputted from the minimum value selector Min6. On the other hand, when DE3 is larger than DE4, "0" is outputted from the comparator C6; DE4 is selected by the selector S6; and DE4 is outputted from the minimum value selector Min6. In doing so, smaller output of DE3 and DE4 is selected and is outputted from the minimum value selector Min6.

The outputs of the upper limit control unit (upper and lower limit clip circuit S2) and the field current cutoff unit (comparator C5) are further inputted to the multiplier M6. The inputted three inputs are multiplied by the multiplier M6 and output thereof is inputted to the minimum value selector Min7. The output of the power generation command input unit (divider D1) is further inputted to the minimum value selector Min7. Smaller output of two inputs is selected by the minimum value selector Min7 and is outputted to the drive circuit 21; and ON/OFF control of the switching element 11 is performed by on-duty output of the drive circuit 21. Therefore, the field current by the output selected by the field coil 2 can be flown. Incidentally, the minimum value selector Min7 can be configured similarly to the configuration of the minimum value selector Min6 (FIG. 8).

The on-duty of the switching element 11 by the selected output is transmitted from the minimum value selector Min7 to the outside (ECU) as a power generation state signal. An analog signal and a digital signal may be transmitted as the power generation state signal in addition to a PWM signal.

In addition, the block configuration of the control device for the vehicle AC generator explained in FIG. 2 can also be configured by software. Furthermore, the control device for the vehicle AC generator is incorporated in the AC generator system; accordingly, even if the power generation command from the ECU cannot receive a normal power generation command due to defects such as a disconnection fault, the upper limit of the field current can be restricted by the upper limit restriction unit, the overvoltage suppression unit, the overheat prevention unit, and the field current cutoff unit; and therefore, the generator can be protected from defects, such as overexcitation, overvoltage, overheat, and loss reduction.

In a normal operation, ON/OFF control of the switching element 11 is performed by on-duty inputted as the power generation command from the outside (ECU). Power generation control condition thereof is outputted to the outside, and the outside (ECU) compares the power generation command outputted by itself to the on-duty from the control device 9; and if the power generation command is equivalent to the on-duty, it is judged that the generator is operated as specified by the command. Furthermore, if the power generation command is different from the on-duty, it can be judged that the generator is not operated as specified by the power generation command. Further, actual on-duty is known; therefore, generator driving torque is known from the actual on-duty, the generator rotational speed, and the output voltage; and thus, the engine rotational speed can be stabilized.

Description will be made in the case of regenerative power generation. When an engine is started up, the outside (ECU) detects that the engine is rotated and outputs the power generation command to the generator. At this time, the power generation command determines the on-duty of the switching element 11 from the generator rotational speed and the DC voltage of the electric double layer capacitor 4 so as to be proper load torque for the engine and is inputted to the control device 9. Incidentally, state signals of respective parts of the engine, vehicle speed, and the like are incorporated in the ECU.

When the generator starts to generate power, the DC voltage of the electric double layer capacitor 4 rises. When the DC voltage of the electric double layer capacitor 4 becomes a predetermined value, the ECU determines the on-duty of the switching element 11 and sets as the power generation command so that the DC voltage of the electric double layer capacitor 4 becomes constant. A vehicle once starts to run, and then, when the vehicle starts speed reduction by brake operation and the like, the ECU sets the power generation command to the maximum on-duty and the generator starts to generate the maximum power.

Then, the DC voltage of the electric double layer capacitor 4 starts to rise, and the field current is further to be increased. However, in the control device 9, an upper limit of the on-duty of the switching element 11 is calculated by the set voltage/the DC voltage, and the calculated upper limit of the on-duty of the switching element is compared to the power generation command from the outside to be selected by the minimum value selector Min7. As a result, the upper limit on-duty of the switching element 11 is selected as a smaller value and becomes the actual on-duty; and thus, the generator is controlled.

In this way, even when the DC voltage (DC voltage of the electric double layer capacitor 4) becomes large, an excessive field current does not flow through the generator, and the generator does not overheat and is not damaged. Furthermore, the actual on-duty at this time is transmitted to the outside; therefore, the ECU can calculate the generator driving torque from the generator rotational speed, the DC output voltage, and the on-duty; and thus, deceleration by the regenerative power generation can be estimated.

When speed reduction is continued and the DC voltage of the electric double layer capacitor 4 exceeds the second set voltage of the suppression gain unit DE3, a signal which makes the on-duty zero by the suppression gain unit DE3 is outputted. Then, the generator stops power generation; and therefore, the electric double layer capacitor 4 is not likely to be damaged by overvoltage. At this time, power generation torque becomes zero and therefore vehicle deceleration becomes small. However, in the ECU, since it is known that the actual on-duty becomes zero, a predetermined deceleration can be kept by actuating a vehicle's mechanical brake as needed; and therefore, a feeling of physical disorder is not given to a driver.

Next, when the vehicle starts to run again, the ECU outputs on-duty zero to the generator as the power generation command. That is, the vehicle is driven in a state where the generator stops power generation. During that time, electric power is supplied to the vehicle's electric load through the power converter 6 from the electric double layer capacitor 4. The generator stops power generation; therefore, the vehicle can be driven without using unnecessary fuel and thus fuel consumption can be improved. When the electric double layer capacitor 4 lowers to a predetermined voltage, the ECU outputs a predetermined on-duty to the generator as the power generation command and the generator starts power generation again. At this time, the generator driving torque increases and therefore the vehicle is to be deaccelerated. However, the ECU calculates the generator driving torque from the actual on-duty, the generator rotational speed, and the DC voltage of the electric double layer capacitor 4 and controls the engine so as to increase engine torque by torque corresponding to the generator driving torque; and therefore, a feeling of physical disorder is not given to a driver.

Even when excessive on-duty is inputted to the power generation command from any cause such as noise, the on-duty can be restricted by the set voltage/the DC voltage and therefore the field coil does not overheat; and when the power generation voltage exceeds the second set voltage, the on-duty becomes zero and thus overvoltage of the electric double layer capacitor 4 can be prevented. Furthermore, when the generator overheats and exceeds the set temperatures of the suppression gain unit DE4, the on-duty becomes zero or reduces and therefore abnormal overheat of the generator can be prevented, and the actual on-duty is further outputted to the outside and thus the ECU compares the power generation command outputted by itself to the actual on-duty; and accordingly, for example, if the actual on-duty is larger, detection can be made that the abnormality is clearly present and therefore a caution signal can also be sent to a driver.

Embodiment 2.

Figure 9:
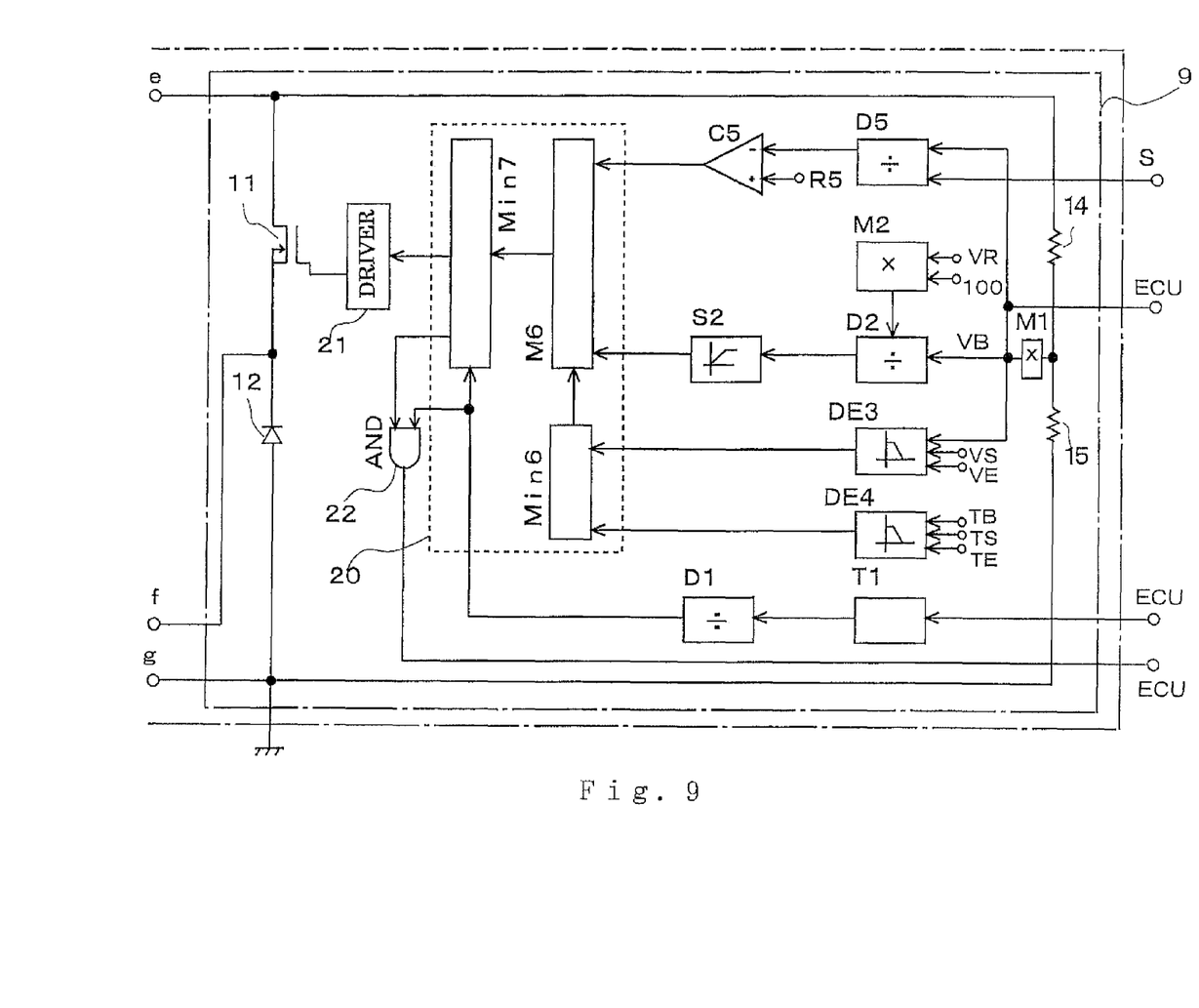
FIG. 9 is a block diagram showing a control device for a vehicle AC generator of Embodiment 2.

FIG. 9 is a block diagram showing a control device 9 for a vehicle AC generator in Embodiment 2. Incidentally, the same reference numerals as those in FIG. 2 show identical or equivalent portions. Those different from FIG. 2 will be described. Reference numeral 22 denotes an AND circuit and on-duty of a switching element 11 by selected output is inputted from a minimum value selector Min7. Further, on-duty of the switching element 11 is inputted from a divider D1 of a power generation command input unit to the AND circuit 22. When both inputs of the AND circuit 22 coincide, "1" is outputted and it is transmitted to the outside that both inputs coincide. That is, transmission is made that ON/OFF control of the switching element 11 is performed by on-duty specified by a power generation command. On the other hand, when both inputs of the AND circuit 22 do not coincide, "0" is outputted, it is transmitted to the outside that both inputs do not coincide. That is, transmission is made that the ON/OFF control of the switching element 11 is not performed by the on-duty specified by the power generation command. As described above, in place of transmission of actual on-duty, it may be transmitted to the outside as to whether or not control is made as specified by the power generation command. A simple output signal of "1" or "0" is transmitted to the outside and is strong against noise. In this way, in the ECU, power generation control condition with respect to the power generation command is known and it enables a vehicle apparatus to drive properly depending on the condition.

Other Embodiment.

A power generation command is an analog signal. The power generation command can be immediately obtained and thus it becomes excellent in readiness.

A signal that outputs actual on-duty to the outside is a PWM signal and signal frequency that outputs the actual on-duty to the outside is frequency similar to the power generation command. In the outside (ECU), power generation command output is the same as actual on-duty input signal frequency (cycle); and therefore, calculation of the on-duty becomes very easy.

A signal that outputs the actual on-duty to the outside is an analog signal. The actual on-duty can be immediately obtained. On the other hand, in the case of a pulse signal, at worst, recognition is delayed for cycles of the signal frequency.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A control device for a vehicle AC generator, in which a DC voltage obtained by rectifying an AC output voltage of an armature coil in said vehicle AC generator that comprises said armature coil and a field coil with a rectifier is applied to said field coil to obtain a field current, and the field current is controlled by ON/OFF control of a switching element connected in series to said field coil, the control device for the vehicle AC generator comprising:

a minimum value selector which compares on-duty of said switching element indicated by a power generation command inputted from a component located on the outside of a body of said control device to on-duty of said switching element calculated inside the body of said control device, selects a smaller on-duty of both on-duties to perform the ON/OFF control of said switching element, and transmits the selected on-duty to the component located on the outside, wherein the on-duty of said switching element calculated inside the body of said control device is an upper limit on-duty capable of continuing energization of said switching element, wherein said minimum value selector compares the on-duty of said switching element indicated by the power generation command to the upper limit on-duty of said switching element calculated inside the body of said control device, and selects the smaller on-duty of both on-duties to perform the ON/OFF control of said switching element, and wherein the upper limit on-duty of said switching element is controlled to be zero when a rotational speed of said AC generator is detected and the DC voltage divided by the rotational speed is not lower than a set value.

2. The control device for the vehicle AC generator according to claim 1, further comprising an upper limit restriction unit in which the upper limit on-duty of said switching element is a set voltage divided by the DC voltage.

3. The control device for the vehicle AC generator according to claim 2, wherein the upper limit on-duty of said switching element is controlled to be zero when the DC voltage obtained by rectifying the AC output voltage with said rectifier exceeds a second set voltage that is larger than the set voltage.

4. The control device for the vehicle AC generator according to claim 2, wherein the upper limit on-duty of said switching element is controlled to be zero when a temperature of said AC generator is detected and the detected AC generator temperature exceeds a set temperature.

5. The control device for the vehicle AC generator according to claim 1, wherein a signal of the power generation command inputted from the component located on the outside of the body of said control device is a pulse width modulation (PWM) signal.

6. The control device for the vehicle AC generator according to claim 1, wherein a signal which transmits the selected on-duty to the component located on the outside is a PWM signal.

7. A control device for a vehicle AC generator, in which a DC voltage obtained by rectifying an AC output voltage of an armature coil in said vehicle AC generator comprising said armature coil and a field coil with a rectifier is applied to said field coil to obtain a field current, and the field current is controlled by ON/OFF control of a switching element connected in series to said field coil, the control device for the vehicle AC generator comprising:

a minimum value selector which compares on-duty of said switching element indicated by a power generation command inputted from a component located on the outside of a body of said control device to on-duty of said switching element calculated inside the body of said control device, selects a smaller on-duty of both on-duties to perform the ON/OFF control of said switching element, and transmits a signal to the component located on the outside indicating whether the selected on-duty coincides with the power generation command from the component located on the outside, wherein the on-duty of said switching element calculated inside the body of said control device is an upper limit on-duty capable of continuing energization of said switching element, wherein said minimum value selector compares the on-duty of said switching element indicated by the power generation command to the upper limit on-duty of said switching element calculated inside the body of said control device, and selects the smaller on-duty of both on-duties to perform the ON/OFF control of said switching element, and wherein the upper limit on-duty of said switching element is controlled to be zero when a rotational speed of said AC generator is detected and the DC voltage divided by the rotational speed is not lower than a set value.

8. The control device for the vehicle AC generator according to claim 7, further comprising an upper limit restriction unit in which the upper limit on-duty of said switching element is a set voltage divided by the DC voltage.

* * * * *